United States Patent [19]

Entschel et al.

[11] 4,225,490
[45] Sep. 30, 1980

[54] HETEROCYCLYL-AZO-PHENYL DYES HAVING A CATIONIC GROUP LINKED THROUGH A BRANCHED ALKYLENE CHAIN TO THE NITROGEN ATOM OF THE COUPLING COMPONENT RADICAL

[75] Inventors: Roland Entschel, Basel; Beat Henzi, Neu-Allschwil, both of Switzerland

[73] Assignee: Sandoz Ltd., Basel, Switzerland

[21] Appl. No.: 640,215

[22] Filed: Dec. 12, 1975

Related U.S. Application Data

[63] Continuation-in-part of Ser. No. 421,018, Dec. 3, 1973, abandoned, which is a continuation-in-part of Ser. No. 262,067, Jun. 12, 1972, abandoned.

[30] Foreign Application Priority Data

Jun. 17, 1971 [CH] Switzerland .......................... 8820/77

[51] Int. Cl.³ .................... C07C 107/04; C09B 44/02; C09B 44/04
[52] U.S. Cl. .............................. 260/156; 260/146 R; 260/146 D; 260/146 T; 260/147; 260/152; 260/153; 260/154; 260/155; 260/157; 260/158; 260/162; 260/163; 260/165; 260/208
[58] Field of Search .................. 260/158, 156, 146 R, 260/157, 152, 155, 154, 146 D

[56] References Cited

U.S. PATENT DOCUMENTS

| | | | |
|---|---|---|---|
| 2,972,508 | 2/1961 | Kruckenberg et al. | 260/158 X |
| 3,033,847 | 5/1962 | Sartori | 260/158 |
| 3,252,965 | 5/1966 | Entschel et al. | 260/154 |
| 3,252,967 | 5/1966 | Entschel et al. | 260/158 |
| 3,560,476 | 2/1971 | Entschel et al. | 260/152 |
| 3,583,970 | 6/1971 | Wolfrum et al. | 260/163 |
| 3,592,806 | 7/1971 | Iizuka et al. | 260/157 |
| 3,658,781 | 4/1972 | Hegar et al. | 260/156 |
| 3,729,459 | 4/1973 | Hegar et al. | 260/205 |
| 3,732,201 | 5/1973 | Ramanathaw | 260/153 |
| 3,812,093 | 5/1974 | Fisher et al. | 260/146 R |

FOREIGN PATENT DOCUMENTS 1105540 4/1961 Fed. Rep. of Germany ............ 260/158

1211079 11/1970 United Kingdom ...................... 260/156

Primary Examiner—Charles F. Warren
Attorney, Agent, or Firm—Gerald D. Sharkin; Richard E. Vila; Melvyn M. Kassenoff

[57] ABSTRACT

Compounds of the formula

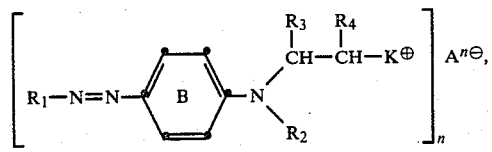

in which
- $R_1$ signifies a substituted thiazole, thiadiazole, isothiazole, oxadiazole or thiophene radical,
- $R_2$ signifies hydrogen or an optionally substituted hydrocarbon radical,
- $R_3$ signifies hydrogen or an optionally substituted alkyl radical,
- $R_4$ signifies hydrogen or an alkyl radical which is unsubstituted or substituted by an aryl radical,
- $K^\oplus$ signifies an ammonium, cycloimmonium, hydrazinium, aminoxide or optionally substituted etherified hydroxyammonium group,
- $A^{n\ominus}$ signifies an anion,
- $n$ signifies 1, 2 or 3, and the ring B is unsubstituted or monosubstituted, provided that at least one of $R_3$ and $R_4$ is other than hydrogen, and provided that the molecule does not contain a water-solubilizing group.

The compounds are useful as basic azo dyes, for dyeing and printing polyacrylonitrile, acrylonitrile copolymers, polymers of asymmetrical dicyanoethylene, polyamides and polyesters modified to contain acid groups, leather, cellulosic materials and paper and for the mass coloration of plastics. The dyes are well-soluble in water, have good salt compatability and give level dyeings having good fastness to light, wet treatments, heat treatments and solvents.

5 Claims, No Drawings

HETEROCYCLYL-AZO-PHENYL DYES HAVING A CATIONIC GROUP LINKED THROUGH A BRANCHED ALKYLENE CHAIN TO THE NITROGEN ATOM OF THE COUPLING COMPONENT RADICAL

This application is a continuation-in-part of application Ser. No. 421,018, filed Dec. 1973 and now abandoned, which in turn is a continuation-in-part of application Ser. No. 262,067, filed June 12th, 1972 and now abandoned.

The present invention relates to new basic azo dyes which are free from water-solubilizing groups.

The invention provides compounds of formula I,

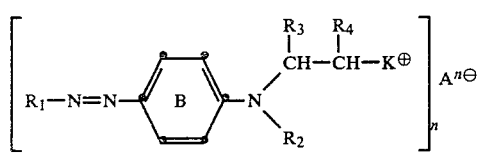

in which
- $R_1$ signifies a substituted thiazole, thiadiazole, isothiazole, oxadiazole or thiophene radical,
- $R_2$ signifies hydrogen or an optionally, substituted hydrocarbon radical,
- $R_3$ signifies hydrogen or an optionally substituted alkyl radical,
- $R_4$ signifies hydrogen or an alkyl radical which is unsubstituted or substituted by an aryl radical,
- $K^\oplus$ signifies an ammonium, cycloimmonium, hydrazinium, aminoxide or optionally substituted etherfied hydroxyammonium group,
- $A^{n\ominus}$ signifies an anion,
- n signifies 1, 2 or 3, and the ring B is unsubstituted or monosubstituted, provided that at least one of $R_3$ and $R_4$ is other than hydrogen, and provided that the molecule does not contain a water-solubilizing group.

Preferred significances for $R_1$ include 4-phenyl-thiadiazole-(2)-,5-phenylthiadiazole-(2),3-phenyl-thiadiazole-(5)-,3-phenyloxadiazole-(5), 3-chloro-thiadiazole-(5), 3-ethylmercaptothiadiazole-(5), 3-ethyl-sulfonylthiadiazole-(5), 5-nitrothiazole-(2),5-cyano-thiazole-(2), 3-nitro-5-acetylthiophene-(2),3-phenyl-4-cyanoisothiazole-(2) and 5-phenyl-4-cyanoisothiazole, and such radicals having substituents on the phenyl radical.

Preferred hydrocarbon radicals for $R_2$ and elsewhere are optionally substituted alkyl, cycloalkyl, phenyl and naphthyl radicals.

Preferred alkyl radicals for $R_3$ have straight or branched chains of 1 to 6, especially 1 to 4, carbon atoms. Preferred substituents for such radicals are hydroxyl, halogen and cyano, or an aryl group which forms an aralkyl radical, e.g. benzyl.

Preferred alkyl radicals for $R_4$ have straight or branched chains of 1 to 6, especially 1 to 4, carbon atoms. The preferred aryl substituent is phenyl.

Preferred significances for $K^\oplus$ include,

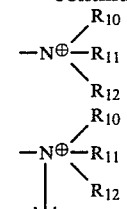   III

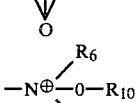   IV

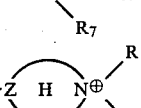   IVa

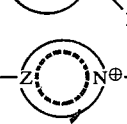   V

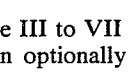   VI and 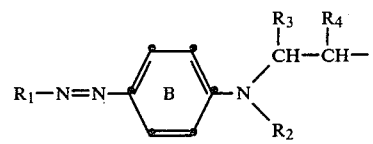   VII in which formulae III to VII $R_6$ and $R_7$ each independently signifies an optionally substituted alkyl or cycloalkyl radical, $R_8$ and $R_9$ each independently signifies a hydrogen atom or an optionally substituted alkyl or cycloalkyl radical, $R_{10}$ signifies an optionally substituted hydrocarbon radical, $R_{11}$ signifies an optionally substituted hydrocarbon radical or a radical of formula L,

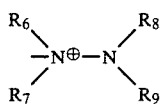   L in which
- $R_1$ to $R_4$ and ring B are as defined above,
- $R_{12}$ signifies an optionally substituted alkyl or cycloalkyl radical,
- $R_{13}$ signifies an optionally substituted alkyl or cycloalkyl radical,
- $R_{14}$ signifies an amino group or an optionally substituted hydrocarbon radical,
- $R_{15}$ signifies an optionally substituted hydrocarbon radical,
- Z signifies a carbon or nitrogen atom, and
$R_6$ with $R_7$, $R_6$ with $R_8$, $R_7$ with $R_9$, $R_{10}$ with $R_{11}$, $R_{11}$ with $R_{12}$, $R_{10}$ with $R_{12}$ or $R_{10}$ with $R_{11}$ and $R_{12}$ each independently may together with the N atom vicinal to these substituents, form a heterocycle, and
the group of formula VI is the radical of a multimembered preferably five or six-membered, saturated or partly saturated ring which may be further substituted, and the group of formula VII signifies the radical of a multimembered, preferably five-or six-membered, unsaturated ring which may be further substituted.

Preferred heterocycles formed from $R_6$ and $R_7$ or $R_{10}$ or $R_{11}$ jointly with the vicinal $N\oplus$ atom are pyrrolidine, piperidine, morpholine, aziridine and piperazine rings.

When the radicals $R_{10}$, $R_{11}$ and $R_{12}$ together with the vicinal N atom form a heterocycle, it is suitably a group of the formula

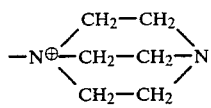

or a pyridinium radical.

The group of formula VII may have cycloaliphatic, heterocyclic or aromatic rings thereon. It may therefore signify, for example, a pyridine, quinoline, piperidine, pyrrolidine, morpholine, aziridine, piperazine, isoquinoline, tetrahydroquinoline, pyrazole, triazole, triazine, pyridazine, imidazole, pyrimidine, thiazole, benzothiazole, thiadiazole, indazole, pyrrole, indole, oxazole, iso-oxazole, pyrazoline, thiophene or tetrazole ring.

Suitable heterocycles formed by $R_6$ together with $R_8$ and the radical $R_7$ together with $R_9$ and the N atoms vicinal to these substituents include pyrazolidine, pyridazine or pyrazoline rings, for instance trimethylenepyrazolidine tetramethylenepyrazoline.

Examples of preferred etherified hydroxylamines are

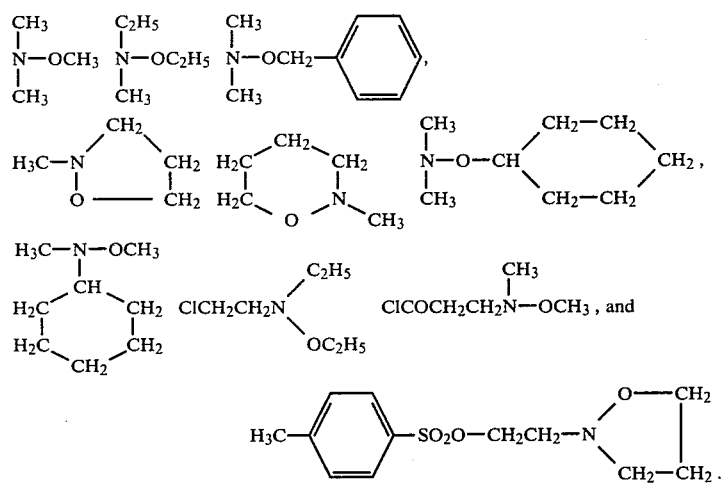

Preferred alkyl radicals for $R_6$ to $R_9$, $R_{12}$ and $R_{13}$ are the same as for $R_3$. Preferred cycloalkyl radicals are cyclohexyl radicals which may be substituted by alkyl or alkoxy groups or by halogen.

"Halogen" as used herein signifies bromine, fluorine, iodine or, preferably, chlorine.

As used herein "aryl" preferably signifies naphthyl or, especially, phenyl.

The anion $A^{n\ominus}$ may be an organic or inorganic ion. The significance of $A^{n\ominus}$ is not critical, provided it does not affect the colour of the compounds, i.e. preferably it is non-chromophoric. Anions conventionally used in basic dyes may be used, for example chloride, bromine, iodide, or a hydroxide, carbonate, bicarbonate, methylsulfate, sulphate, bisulphate, perchlorate, phosphate, phosphorous tungstic molybdate, borate, benzenesulphonate, 4-methylbenzenesulphonate, naphthalenesulphonate, 4-chlorobenzenesulphonate, amidosulphonate, oxalate, acetate, maleinate, malate, lactate, propionate, citrate, methanesulphonate, chloroacetate, adipate and benzoate ions or complex anions such as that of zinc chloride double salts.

All the radicals of aromatic character, in particular the aromatic carbocylic and aromatic heterocyclic radicals, e.g. aryl radicals such as phenyl, naphthyl, tetrahydronaphthyl, and pyridyl, quinolyl and tetrahydroquinolyl radicals, may bear substituents, that is to say non-water-solubilizing substituents, for example halogen atoms, nitro, amino, cyano, thiocyano, hydroxyl, alkyl, alkoxy, trifluoroalkyl, trichloroalkyl, phenyl, phenoxy, alkylamino, dialkylamino, phenylamino, acyl, acyloxy and acylamino groups, e.g. acetylamino, benzoylamino, and alkylsulphonyl, arylsulphonyl, sulphonic acid amide (sulfamoyl), sulphonic acid alkyl amide (alkylsulfamoyl), sulphonic acid dialkyl amide (dialkylsulfamoyl), sulphonic acid arylamide (arylsulfamoyl) groups and arylazo, e.g. phenylazo and diphenylazo.

Especially preferred compounds of formula I are those of formula Ia.

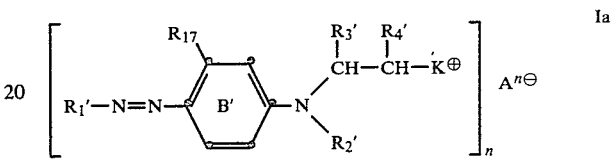

in which
$R_1'$ signifies 3-phenylthiadiazole-(5), 5-phenylthiadiazole-(2),4-phenylthiadiazole-(3), 3-phenyloxadiazole-(5), 3-chlorothiadiazole-(5), 3-ethylmercaptothiadiazole-(5), 3ethylsulfonylthiadiazole-(5), 5-nitrothiazole-(2), 5-cyanothiazole-(2), 3-nitro-5-acetylthiophene-(2), 3-phenyl-4-cyanoisothiazole-(2) or 5-phenyl-4-cyanoisothiazole, $R_2'$ signifies methyl, ethyl, propyl, butyl or benzyl, $R_3'$ and $R_4'$ independently signify hydrogen or alkyl of 1 to 4 carbon atoms, provided one of $R_3'$ and $R_4'$ is other than hydrogen, $R_{17}$ signifies hydrogen, halogen, methyl, ethyl or methoxy, K signifies a radical of the formula

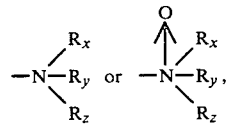

in which $R_x$, $R_y$ and $R_z$ independently signify alkyl of 1 to 4 carbon atoms, which may be substituted by hydroxyl, —CONH$_2$, cyano or phenyl, and one of $R_x$, $R_y$ and $R_z$ may signify amino or two of $R_x$, $R_y$ and $R_z$, together with the nitrogen atom, signify a ring which is

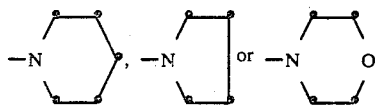

or all of $R_x$, $R_y$ and $R_z$ together with the nitrogen atom signify

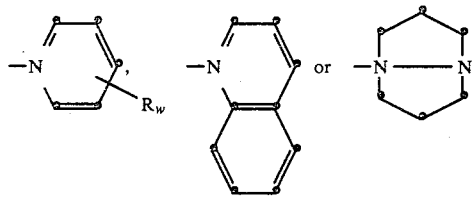

in which $R_w$ signifies hydrogen or alkyl of 1 to 4 carbon atoms, or a radical of the formula

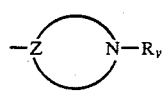

in which

Z signifies a carbon or nitrogen atom, $R_y$ signifies an alkyl radical of 1 to 4 carbon atoms, and the ring is unsaturated or partly saturated and has 5 or 6 ring members, the ring B' has no further substituents and n is defined above, and $A^{n\ominus}$ signifies an anion, preferably a non-chromophoric anion.

The invention also provides a process for the production of a compound of formula I, which comprise:

(a) coupling the diazo compound from an amine of formula XIV, $$R_1\text{—}NH_2 \qquad XIV$$

in which $R_1$ is as defined above, with a coupling component of formula XV,

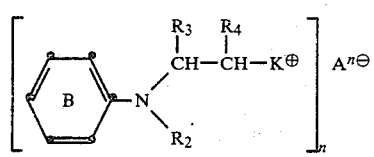

in which B, n, $R_2$, $R_3$, $R_4$, K and A are as defined above, (b) quaternating a compound of formula XVI,

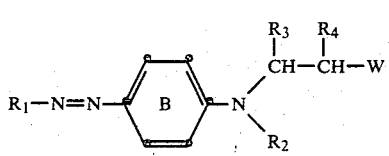

in which $R_1$, $R_2$, $R_3$, $R_4$ and B are as defined above, and W signifies a group of the formula

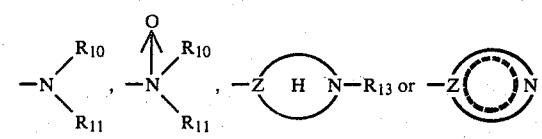

in which $R_{10}$, $R_{11}$, $R_{13}$ and Z are as defined above, to produce a compound of formula Ib,

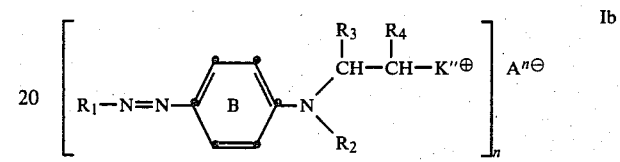

in which $R_1$ to $R_4$, B, n and A are as defined above, and

K'' signifies a radical of formula IV, IVa, VI or VII as defined above, (c) reacting an azo compound of formula XX,

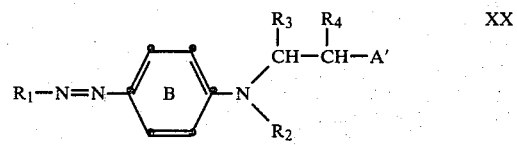

in which $R_1$ to $R_4$, and B are as defined above, and

A' signifies a radical which may be converted into an anion, with a compound of formula XXI, XXII, XXIIa or XXIII,

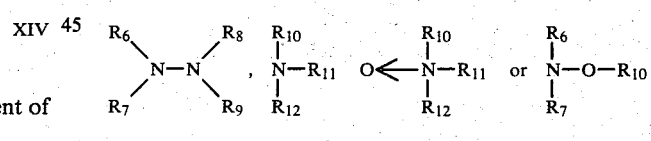

in which $R_6$ to $R_{12}$ are as defined above, to produce a compound of formula Ic,

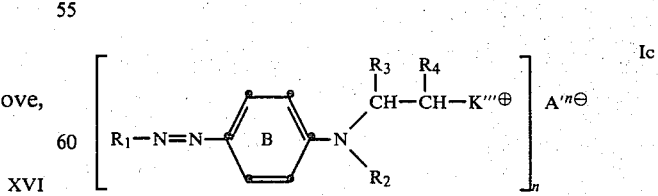

in which $R_1$ to $R_4$, B, n and A' are as defined above, and

K''' signifies a radical of formula III, IV, IVa or V as defined above, (d) reacting a compound of formula XXIV,

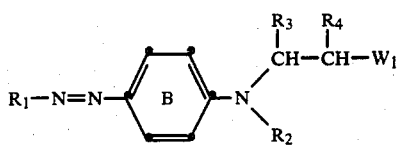

XXIV in which
R₁ to R₄ and B are as defined above, and
W₁ signifies a group of formula LII as defined above
or

in which
R₆ and R₇ are as defined above, with a compound of formula XXVI, $$Hal-NH_2 \quad\quad XXVI$$

in which Hal signifies a halogen atom or a compound of formula XXVII,

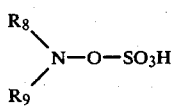

in which
R₈ and R₉ are as defined above, to produce a compound of formula Id,

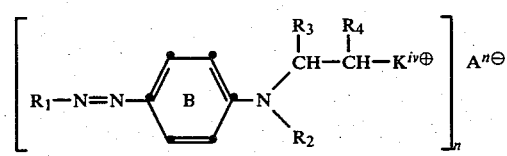

in which
R₁ to R₄, B, n and A are as defined above, and
K$^{iv}$ signifies a group of formula III as defined above
or

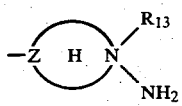

in which Z and R₁₃ are as defined above.

It will be appreciated that the anion $A^{n\ominus}$ may be exchanged for another anion, for example with the aid of an ion exchanger or by reaction with salts or acids, if necessary in more than one step, for example via the hydroxide or bicarbonate.

The coupling reaction of a diazotized compound of formula XIV with a compound of formula XV may be carried out in conventional manner, e.g. in a neutral to acid medium at temperatures around 0° C., if necessary in the presence of a buffering agent.

The quaternation reaction of process variant (b) may be carried out in conventional manner, e.g. in an inert solvent or in aqueous suspension or without solvent in an excess of the quaternating agent, if necessary at high temperatures and in buffered medium. It is advantageous to use organic acids, if necessary in conjunction with a basic compound.

The suitable quaternating agents include alkyl halides, e.g. methyl and ethyl chloride, bromide and iodide, alkyl sulphates such as dimethyl sulphate, benzyl chloride, acrylic acid amides with hydrohalic acids e.g. $CH_2=CH-CO-NH_2/HCl$, chloroacetic acid alkyl ester and β-chloropropionic amide, epoxides, e.g. ethylene oxide, propylene oxide and epichlorohydrin. Examples of quaternating agents are $R_{12}$—A, $R_{14}$—A and $R_{15}$—A.

In process variant (c), the reaction of the compound of formula XX with a compound of formula XXI, XXII or XXIII is suitably carried out in an organic solvent in the temperature range of about −50° C. to +250° C., preferably at 10° C. to +120° C. This reaction can also be effected in aqueous medium, with or without the addition of an organic solvent, or in the absence of solvent, at the stated temperatures.

In process variant (d) the reaction of a compound of formula XVIII with a halogen amine of formula XXVI is suitably carried out in an organic solvent at temperatures from −50° C. to +80° C. The reaction can also be carried out in aqueous medium, if necessary with the addition of an organic solvent, at the stated temperatures, with the halogen amine added either in the form of the gas or in an organic solvent, in water or in a mixture of organic solvent and water. The use of chloroamine is preferred.

The reaction of a compound of formula XXIV is carried out in conventional manner with a compound of formula XXVII and is suitably carried out at −10° C. to +100° C.

The starting materials of these processes are known or can be produced from known compounds by known methods or analogously to known methods.

The compounds of formula I possess properties which indicate their usefulness in dyeing and printing fibres, yarns and textiles which consist of, or contain as component, fibres spun from homopolymers or copolymers of acrylonitrile or asymmetrical dicyanoethylene. The compounds are also indicated for use with synthetic polyamide and polyester fibres modified by the introduction of acid groups. Polyamide fibres of this type are described, for example, in Belgian Pat. No. 706,104. Analogous polyester fibres are described in U.S. Pat. No. 3,379,723. The compounds are also indicated for use in the dyeing of leather and paper and for the mass colouration of plastics.

The compounds are particularly indicated for use in exhaust dyeing in which they are applied from an aqueous neutral or acid medium, at 60° C. to the boil, or at temperatures above 100° C. under static pressure.

The compounds give level dyeings showing good fastness to light and wet treatment, and fastness to water, sea, water, washing, perspiration, sublimation, pleating, decatizing, pressing, steaming, dry cleaning, cross dyeing and common solvents is indicated.

The compounds are well soluble, especially in water, show good salt compatibility (e.g. with sulphates and thiocyanates) and pH stability, and are stable to boiling. They build up rapidly on the aforenamed substrates and reserve substrates for which they have no affinity, for example unmodified natural and synthetic polyamide fibres.

The compounds of this invention which are well soluble in organic solvents are indicated for use in the mass colouration of natural and synthetic polymers and natural and synthetic resins in the dissolved or undissolved state, for example, to dye tannin-treated cotton and regenerated cellulosic fibres. Furthermore, the compounds of the invention are suitable for dyeing using the Neochrome process.

It has been found that mixtures of two or more of the compounds or mixtures of isomers or mixtures of these with other dyes of cationic character can be employed with advantage under certain conditions.

In the following Examples the parts and percentages are by weight and the temperatures in degrees centigrade.

EXAMPLE 1

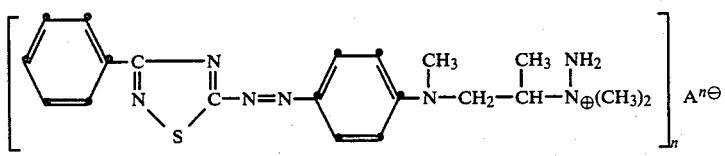

(a) A nitrosylsulphuric acid solution is prepared with 27.2 parts of 96–98% sulphuric acid and 7.8 parts of 100% sodium nitrite. It is diluted with 40 parts of glacial acetic acid and 67 parts of 85% phosphoric acid and set for reaction with 9.2 parts (0.05 mols) of 5-amino-3-phenyl-1,2,4-thiadiazole, added gradually in portions. The solution is reacted for 9 hours at 0°–5° with stirring. After being clarified by filtration, the ice-cold, pale yellow diazo solution is dropped at 0°–5° into a solution of 20 parts of 63% 1-(1'-methyl-2'-N-methyl-N-phenylamino)-ethyl-1,1-dimethylhydrazinium chloride and 3 parts of aminosulphonic acid in 100 parts of water. At the same time 115 parts of ice are added. At 5° 38 parts of 30% sodium hydroxide solution and 100 parts of ice are entered into the clear solution, then 60 parts of sodium chloride are added to salt out the product. Stirring is continued for 4 hours, the product is then filtered and washed with 40 parts of a 20% solution of common salt in sulphuric acid. The filtercake is stirred into 300 parts of water at 40°, the pH adjusted to 5.5–6.0 with 3 parts of 30% sodium hydroxide solution and the suspension stirred for 2 hours. The product is filtered, washed again with 150 parts of 3% common salt solution and dried. 20.1 Parts of the product in 94.7% purity are obtained.

(b) The same product can be produced as follows. 37.2 parts of 3-phenyl-1,2,4-thiadiazole-(5 azo 4)-[1-(N-methyl-N-2'-methyl-2'-methyl-2'-chloroethyl)-aniline] are dissolved in 300 parts of chlorobenzene and 4.5 parts of n-butanol at 50°–70°. In 30 minutes 6.6 parts of 1,1-dimethylhydrazine are added with stirring at 60°–80° under a nitrogen atmosphere. The solution is stirred for 1 hour and then cooled to 5°–10°, on which the product settles out in crystalline form. It is isolated by filtration and dried to give 27.6 parts of the product in 94.2% purity.

(c) The same product can be produced as follows. 38 Parts of 3-phenyl-1,2,4-thiadiazole-(5 azo 4)-1-(N-methyl-N-2'-methyl-2'-dimethylaminoethyl)-aniline are dissolved in 900 parts of chlorobenzene. In one hour 7.1 parts of freshly prepared gaseous chloramine are directed into the solution with vigorous stirring. The product settles out in the form of the salt and is filtered, washed with 50 parts of chlorobenzene and dried. It is obtained in a yield of 37.6 parts and in 93.8% purity.

(d) If hydroxylamine-0-sulphonic acid is used in place of chloramine, the procedure is as follows. 29 Parts of 1-(N-methyl-N-2'-methyl-2'-dimethylaminoethyl)-aniline are dissolved in 55 parts of water with 5 parts of glacial acetic acid. The solution is dropped at 95° into an ice-cold solution of 6 parts of hydroxylamine-0-sulphonic acid in 30 parts of water with vigorous stirring. The temperature is held at 95° for 20 minutes, then the solution is allowed to cool to 5°–10° and adjusted to pH 10 with sodium hydroxide solution. The unreacted starting product is extracted twice using 60 parts of benzene each time. The aqueous solution is weakly acidified with hydrochloric acid and the diazonium solution of 5-amino-3-phenyl-1,2,4-thiadiazole, prepared as in (a) above is added dropwise. The product is isolated as in (a) above. This procedure results in 18.2 parts of the dye in 93.6% purity.

EXAMPLE 2

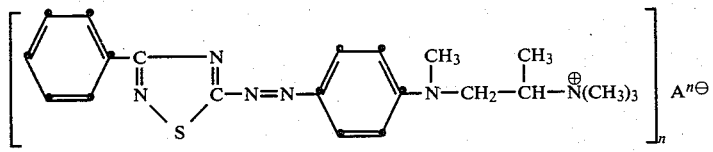

The diazo compound from 5-amino-3-phenyl-1,2,4-thiadiazole formed as in Example 1 is coupled with 10.5 parts of the compound of the formula

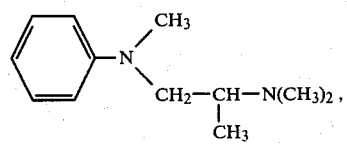

in the presence of 3 parts of aminosulphonic acid and 80 parts of glacial acetic acid, with the simultaneous addition of 20 parts of ice. The product is worked up as described in Example 1, except that the solution is adjusted to pH 9–10 instead of 5.5–6.0. On drying, 17.2 parts of the product in 95.8% purity are obtained. 9.5 Parts of the powder product are dissolved in 250 parts of chlorobenzene. The solution is brought to the boil in 15 minutes with stirring, 6.3 parts of dimethyl sulphate are added and the solution held at the boil for a further 2 hours. It is evaporated to dryness in vacuum, the residue dissolved in 250 parts of water, and 25 parts of sodium chloride added to precipitate the product, which is isolated by filtration and dried. The dye is obtained in a yield of 19.1 parts in 92.3% purity. On polyacrylonitrile fibres and polyamide fibres modified by the introduction of acid groups it gives fast dyeings of red shade.

Example of Application

A mixture of 20 parts of the dye produced as in Example 1 and 80 parts of dextrin is ground for 48 hours in a ball mill to give a fine powder. One of the part of the powder is pasted with 1 part of 40% acetic acid and 200 parts of demineralized water are poured over the paste with stirring and boiling to dissolve. The solution is added to 7000 parts of demineralized water, to which 2 parts of glacial acetic are added. 100 parts of a fabric of polyacrylonitrile fibre, which may be previously treated for 10 to 15 minutes at 60° in a bath of 8000 parts of water and 2 parts of glacial acetic acid, are entered into a dyebath at 60°. The dyebath is raised to 98°–100° in 30 minutes and the fabric dyed at at this temperature for 1½ hours. On removal it is rinsed and dried. A red dyeing of good light and wet fastness is obtained.

Table 1 gives the structural composition of further compounds which can be produced in analogy with the procedures of Example 1 or 2. They are of general formula Ie,

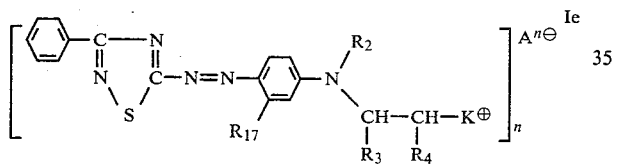

where $R_2$ to $R_4$, $R_{17}$ and $K^{\oplus}$ have the meanings noted in the pertinent columns. The anion $A^{n\ominus}$ may be any one of those named in the foregoing. The symbol $K_{1-34}^{\oplus}$ has the meanings given in Table A.

Table A

| | $K^{\oplus}$ in formulae Ie to Ih may represent any one of the radicals $K_1^{\oplus}$ to $K_{34}^{\oplus}$, which signify: |
|---|---|
| $K_1$ | $-N(CH_3)_3]^{\oplus}$ |
| $K_2$ | $-N(C_2H_5)_3]^{\oplus}$ |
| $K_3$ | $-N(C_2H_5)_2\begin{pmatrix}CH_3\end{pmatrix}]^{\oplus}$ |
| $K_4$ | $-N(CH_3)_2\begin{pmatrix}C_2H_5\end{pmatrix}]^{\oplus}$ |
| $K_5$ | $-N(C_2H_4OH)_3]^{\oplus}$ |
| $K_6$ | $-N(C_2H_4OH)_2\begin{pmatrix}CH_3\end{pmatrix}]^{\oplus}$ |
| $K_7$ | $-N(CH_3)(C_2H_5)(CH_2OH)]^{\oplus}$ |

Table A-continued

| | $K^{\oplus}$ in formulae Ie to Ih may represent any one of the radicals $K_1^{\oplus}$ to $K_{34}^{\oplus}$, which signify: |
|---|---|
| $K_8$ | $-N(CH_3)_2(C_2H_4-CONH_2)]^{\oplus}$ |
| $K_9$ | $-N(CH_3)_2(C_2H_4OH)]^{\oplus}$ |
| $K_{10}$ | pyridinium |
| $K_{11}$ | N-methyl piperidinium with H |
| $K_{12}$ | N-methyl pyrrolidinium with H |
| $K_{13}$ | N-methyl morpholinium with H |
| $K_{14}$ | N-(β-carbamoylethyl) piperidinium with H |
| $K_{15}$ | N-(β-carbamoylethyl) morpholinium with H |
| $K_{16}$ | N-(β-carbamoylethyl) pyrrolidinium with H |
| $K_{17}$ | α-picolinium |
| $K_{18}$ | quinolinium |
| $K_{19}$ | $-N(CH_3)_2(NH_2)]^{\oplus}$ |

Table A-continued

K⊕ in formulae Ie to Ih may represent any one of the radicals K₁⊕ to K₃₄⊕, which signify:

K₂₀ 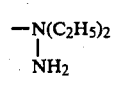

K₂₁ 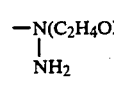

K₂₂ 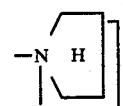

K₂₃ 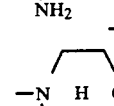

K₂₄ 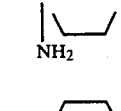

K₂₅ 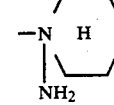

K₂₆ 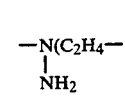

K₂₇ 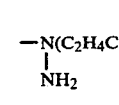

Table A-continued

K⊕ in formulae Ie to Ih may represent any one of the radicals K₁⊕ to K₃₄⊕, which signify:

K₂₈ 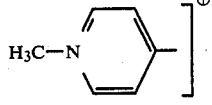

K₂₉ 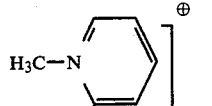

K₃₀ 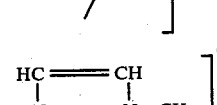

K₃₁ 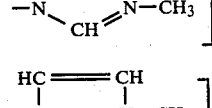

K₃₂ 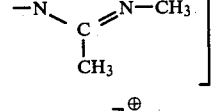

K₃₃ 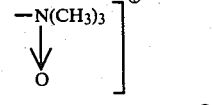

K₃₄ 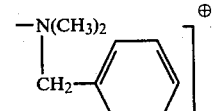

Table I

| No. | $R_2$ | $R_3$ | $R_4$ | $R_{17}$ | K⊕ | Shade of dyeing on polyacrylonitrile fibre |
|---|---|---|---|---|---|---|
| 3 | —CH₃ | H | —CH₃ | H | $K_2$ | red |
| 4 | " | H | " | H | $K_3$ | " |
| 5 | " | H | " | H | $K_4$ | " |
| 6 | " | H | " | H | $K_5$ | " |
| 7 | " | H | " | H | $K_6$ | " |
| 8 | " | H | " | H | $K_7$ | " |
| 9 | " | H | " | H | $K_8$ | " |
| 10 | " | H | " | H | $K_9$ | " |
| 11 | " | H | " | H | $K_{10}$ | " |
| 12 | " | H | " | H | $K_{11}$ | " |
| 13 | " | H | " | H | $K_{12}$ | " |
| 14 | " | H | " | H | $K_{13}$ | " |
| 15 | " | H | " | H | $K_{14}$ | " |
| 16 | " | H | " | H | $K_{15}$ | " |
| 17 | " | H | " | H | $K_{16}$ | " |
| 18 | " | H | " | H | $K_{17}$ | " |
| 19 | " | H | " | H | $K_{18}$ | " |
| 20 | " | H | " | H | $K_{20}$ | " |
| 21 | " | H | " | H | $K_{21}$ | " |
| 22 | " | H | " | H | $K_{22}$ | " |
| 23 | " | H | " | H | $K_{23}$ | " |
| 24 | " | H | " | H | $K_{24}$ | " |
| 25 | " | H | " | H | $K_{25}$ | " |
| 26 | " | H | " | H | $K_{26}$ | " |
| 27 | " | H | " | H | $K_{27}$ | " |
| 28 | " | H | " | H | $K_{28}$ | " |

Table I-continued

| No. | $R_2$ | $R_3$ | $R_4$ | $R_{17}$ | $K^\oplus$ | Shade of dyeing on polyacrylonitrile fibre |
|---|---|---|---|---|---|---|
| 29 | " | H | " | H | $K_{29}$ | " |
| 30 | " | H | " | H | $K_{30}$ | " |
| 31 | " | H | " | H | $K_{31}$ | " |
| 32 | " | H | " | H | $K_{32}$ | " |
| 33 | " | H | " | H | $K_{33}$ | " |
| 34 | " | H | " | H | $K_{34}$ | " |
| 35 | " | —$CH_3$ | H | H | $K_1$ | " |
| 36 | " | " | H | H | $K_2$ | " |
| 37 | " | " | H | H | $K_3$ | " |
| 38 | " | " | H | H | $K_4$ | " |
| 39 | " | " | H | H | $K_5$ | " |
| 40 | " | " | H | H | $K_6$ | " |
| 41 | " | " | H | H | $K_7$ | " |
| 42 | " | " | H | H | $K_8$ | " |
| 43 | " | " | H | H | $K_9$ | " |
| 44 | " | " | H | H | $K_{10}$ | " |
| 45 | " | " | H | H | $K_{11}$ | " |
| 46 | " | " | H | H | $K_{12}$ | " |
| 47 | " | " | H | H | $K_{13}$ | " |
| 48 | " | " | H | H | $K_{14}$ | " |
| 49 | " | " | H | H | $K_{15}$ | " |
| 50 | " | " | H | H | $K_{17}$ | " |
| 51 | " | " | H | H | $K_{19}$ | " |
| 52 | " | " | H | H | $K_{20}$ | " |
| 53 | " | " | H | H | $K_{21}$ | " |
| 54 | " | " | H | H | $K_{23}$ | " |
| 55 | " | " | H | H | $K_{24}$ | " |
| 56 | " | " | H | H | $K_{28}$ | " |
| 57 | " | " | H | H | $K_{29}$ | " |
| 58 | " | " | H | H | $K_{30}$ | " |
| 59 | " | " | H | H | $K_{31}$ | " |
| 60 | " | " | H | H | $K_{33}$ | " |
| 61 | " | " | H | H | $K_{34}$ | " |
| 62 | —$C_2H_5$ | H | —$CH_3$ | H | $K_1$ | " |
| 63 | " | H | " | H | $K_3$ | " |
| 64 | " | H | " | H | $K_{19}$ | " |
| 65 | " | H | " | H | $K_{33}$ | " |
| 66 | " | H | " | H | $K_{34}$ | " |
| 67 | " | H | " | H | $K_{10}$ | " |
| 68 | " | —$CH_3$ | H | H | $K_1$ | " |
| 69 | " | " | H | H | $K_3$ | " |
| 70 | " | " | H | H | $K_{10}$ | " |
| 71 | " | " | H | H | $K_{19}$ | " |
| 72 | " | " | H | H | $K_{33}$ | " |
| 73 | " | " | H | H | $K_{34}$ | " |
| 74 | —$C_4H_9$ | H | —$CH_3$ | H | $K_1$ | " |
| 75 | " | H | " | H | $K_3$ | " |
| 76 | " | H | " | H | $K_{10}$ | " |
| 77 | " | H | " | H | $K_{19}$ | " |
| 78 | —$C_2H_4CN$ | H | " | H | $K_1$ | " |
| 79 | " | H | " | H | $K_{10}$ | " |
| 80 | " | H | " | H | $K_{19}$ | " |
| 81 | —$CH_2$—C$_6$H$_5$ | H | " | H | $K_1$ | " |
| 82 | " | H | " | H | $K_{10}$ | " |
| 83 | " | H | " | H | $K_{19}$ | " |
| 84 | —$C_2H_4COOC_2H_5$ | H | " | H | $K_1$ | " |
| 85 | " | H | " | H | $K_{10}$ | " |
| 86 | " | H | " | H | $K_{19}$ | " |
| 87 | —$CH_3$ | —$CH_3$ | " | H | $K_1$ | " |
| 88 | " | " | " | H | $K_{10}$ | " |
| 89 | " | " | " | H | $K_{19}$ | " |
| 90 | " | H | —$CH_2$—C$_6$H$_5$ | H | $K_1$ | " |
| 91 | " | H | " | H | $K_{10}$ | " |
| 92 | " | H | " | H | $K_{19}$ | " |
| 93 | —$C_2H_5$ | H | —$CH_3$ | —$CH_3$ | $K_1$ | " |
| 94 | " | H | " | " | $K_2$ | " |
| 95 | " | H | " | " | $K_3$ | " |
| 96 | " | H | " | " | $K_4$ | " |
| 97 | " | H | " | " | $K_5$ | " |
| 98 | " | H | " | " | $K_6$ | " |
| 99 | " | H | " | " | $K_7$ | " |
| 100 | " | H | " | " | $K_8$ | " |

Table I-continued

| No. | R₂ | R₃ | R₄ | R₁₇ | K⊕ | Shade of dyeing on polyacrylonitrile fibre |
|---|---|---|---|---|---|---|
| 101 | " | H | " | " | $K_9$ | " |
| 102 | " | H | " | " | $K_{10}$ | " |
| 103 | " | H | " | " | $K_{11}$ | " |
| 104 | " | H | " | " | $K_{12}$ | " |
| 105 | " | H | " | " | $K_{13}$ | blue-red |
| 106 | " | H | " | " | $K_{14}$ | " |
| 107 | " | H | " | " | $K_{15}$ | " |
| 108 | " | H | " | " | $K_{16}$ | " |
| 109 | " | H | " | " | $K_{17}$ | " |
| 110 | " | H | " | " | $K_{18}$ | " |
| 111 | " | H | " | " | $K_{19}$ | " |
| 112 | " | H | " | " | $K_{20}$ | " |
| 113 | " | H | " | " | $K_{21}$ | " |
| 114 | " | H | " | " | $K_{22}$ | " |
| 115 | " | H | " | " | $K_{23}$ | " |
| 116 | " | H | " | " | $K_{24}$ | " |
| 117 | " | H | " | " | $K_{25}$ | " |
| 118 | " | H | " | " | $K_{26}$ | " |
| 119 | " | H | " | " | $K_{27}$ | " |
| 120 | " | H | " | " | $K_{28}$ | " |
| 121 | " | H | " | " | $K_{29}$ | " |
| 122 | " | H | " | " | $K_{30}$ | " |
| 123 | " | H | " | " | $K_{31}$ | " |
| 124 | " | H | " | " | $K_{32}$ | " |
| 125 | " | H | " | " | $K_{33}$ | " |
| 126 | " | H | " | " | $K_{34}$ | " |
| 127 | " | —CH₃ | H | " | $K_1$ | " |
| 128 | " | " | H | " | $K_{10}$ | " |
| 129 | " | " | H | " | $K_{19}$ | " |
| 130 | —CH₂—C₆H₅ | H | " | " | $K_1$ | " |
| 131 | " | H | " | " | $K_{10}$ | red |
| 132 | " | H | " | " | $K_{19}$ | " |
| 133 | —C₂H₅ | —CH₃ | " | " | $K_1$ | blue-red |
| 134 | " | H | " | —OCH₃ | $K_1$ | " |
| 135 | " | H | " | " | $K_{10}$ | " |
| 136 | " | H | " | " | $K_{19}$ | " |
| 137 | " | H | " | Cl | $K_1$ | " |
| 138 | " | H | " | " | $K_{19}$ | " |

Table II below shows the structural composition of further dyes which can be produced in accordance with the procedure of Example 1 or 2. They are of general formula If,

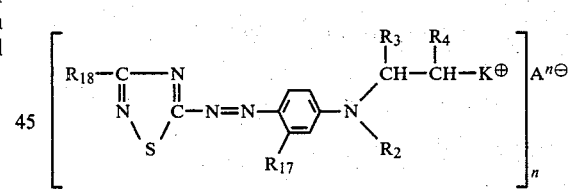

where $R_2$ to $R_4$, $R_{17}$, $K^\oplus$ and $R_{18}$ have the meanings given in the table. The anion $A^\ominus$ may be any one of those named in the foregoing.

Table II

| No. | R₁₈ | R₂ | R₃ | R₄ | R₁₇ | K⊕ | Shade of dyeing on polyacrylonitrile fibre |
|---|---|---|---|---|---|---|---|
| 139 | CH₃—C₆H₄— | —CH₃ | H | —CH₃ | H | $K_1$ | red |
| 140 | " | " | H | " | H | $K_{10}$ | " |
| 141 | " | " | H | " | H | $K_{19}$ | " |
| 142 | O₂N—C₆H₄— | —C₂H₅ | H | " | —CH₃ | $K_1$ | rubine |
| 143 | " | " | H | " | " | $K_{10}$ | " |
| 144 | " | " | H | " | " | $K_{19}$ | " |

Table II-continued

| No. | R$_{18}$ | R$_2$ | R$_3$ | R$_4$ | R$_{17}$ | K$^\oplus$ | Shade of dyeing on polyacrylonitrile fibre |
|---|---|---|---|---|---|---|---|
| 145 | 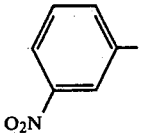 | " | H | " | " | K$_1$ | bluish red |
| 146 | " | " | H | " | " | K$_{10}$ | " |
| 147 | " | " | H | " | " | K$_{19}$ | " |
| 148 | Cl | —CH$_3$ | H | " | H | K$_1$ | red |
| 149 | " | " | H | " | H | K$_{10}$ | " |
| 150 | " | " | H | " | H | K$_{19}$ | " |
| 151 | " | " | —CH$_3$ | H | H | K$_1$ | " |
| 152 | " | " | " | H | H | K$_{10}$ | " |
| 153 | " | " | " | H | H | K$_{19}$ | " |
| 154 | " | —C$_2$H$_5$ | " | —CH$_3$ | —CH$_3$ | K$_1$ | bluish red |
| 155 | " | " | " | " | " | K$_{10}$ | " |
| 156 | " | " | H | " | " | K$_{19}$ | " |
| 157 | C$_2$H$_5$—S— | —CH$_3$ | H | —CH$_3$ | H | K$_1$ | blue-red |
| 158 | " | " | H | " | H | K$_{10}$ | " |
| 159 | " | " | H | " | H | K$_{19}$ | " |
| 160 | C$_2$H$_5$SO$_2$— | " | H | " | H | K$_1$ | red |
| 161 | " | " | H | " | H | K$_{10}$ | " |
| 162 | " | " | H | " | H | K$_{19}$ | " |
| 163 | " | —C$_2$H$_5$ | H | " | —CH$_3$ | K$_1$ | bluish red |
| 164 | " | " | H | " | " | K$_{10}$ | " |
| 165 | " | " | H | " | " | K$_{19}$ | " |
| 166 | —CH$_3$ | —CH$_3$ | H | —CH$_3$ | H | K$_1$ | red |
| 167 | " | " | H | " | H | K$_{10}$ | " |
| 168 | " | " | H | " | H | K$_{19}$ | " |
| 169 | " | —C$_2$H$_5$ | H | " | —CH$_3$ | K$_1$ | bluish red |
| 170 | " | " | H | " | " | K$_{10}$ | " |
| 171 | " | " | H | " | " | K$_{19}$ | " |

EXAMPLE 172

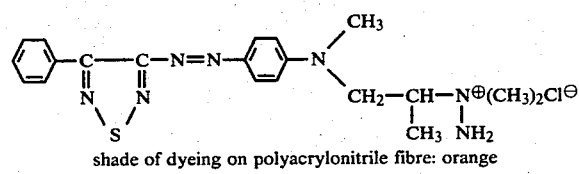

shade of dyeing on polyacrylonitrile fibre: orange

EXAMPLE 173

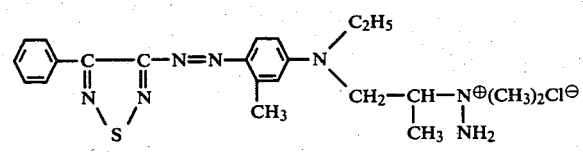

In Table III below the structural composition of further compounds is shown, which can be produced in accordance with the procedure of Example 1 or 2. They are of general formula Ig,

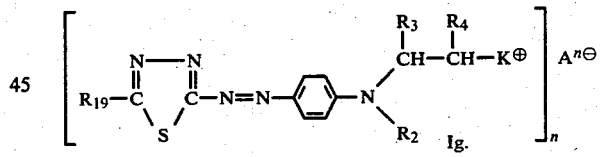

where R$_2$ to R$_4$, R$_{19}$ and K$^\oplus$ have the meanings given in the table. The anion A$^\ominus$ may be any one of those named in the foregoing.

Table III

| No. | R$_{19}$ | R$_2$ | R$_3$ | R$_4$ | R$_{17}$ | K$^\oplus$ | Shade of dyeing on polyacrylonitrile fibre |
|---|---|---|---|---|---|---|---|
| 174 | phenyl | —CH$_3$ | H | —CH$_3$ | H | K$_1$ | scarlet |
| 175 | " | " | H | " | H | K$_{10}$ | " |
| 176 | " | " | H | " | H | K$_{19}$ | " |
| 177 | phenyl | —C$_2$H$_5$ | H | " | —CH$_3$ | K$_1$ | red |
| 178 | " | " | H | " | " | K$_{10}$ | " |
| 179 | " | " | H | " | " | K$_{19}$ | " |
| 180 | CH$_3$-phenyl | —CH$_3$ | H | " | H | K$_1$ | scarlet |
| 181 | " | " | H | " | H | K$_{10}$ | " |

—continued orange

Table III-continued

| No. | R_{19} | R_2 | R_3 | R_4 | R_{17} | K⊕ | Shade of dyeing on polyacrylonitrile fibre |
|---|---|---|---|---|---|---|---|
| 182 | " | " | H | " | H | $K_{19}$ | " |
| 183 | Cl—⟨⟩— | " | H | " | H | $K_1$ | " |
| 184 | " | " | H | " | H | $K_{10}$ | " |
| 185 | " | " | H | " | H | $K_{19}$ | " |
| 186 | $O_2N$—⟨⟩— | —$C_2H_5$ | H | " | —$CH_3$ | $K_1$ | red |
| 187 | " | " | H | " | " | $K_{10}$ | " |
| 188 | " | " | H | " | " | $K_{19}$ | " |
| 189 | $CH_3O$—⟨⟩— | —$CH_3$ | H | " | " | $K_1$ | scarlet |
| 190 | " | " | H | " | " | $K_{10}$ | " |
| 191 | " | " | H | " | " | $K_{19}$ | " |

EXAMPLE 192

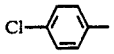

Shade of dyeing on polyacrylonitrile fibre: bluish red

EXAMPLE 193

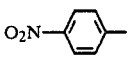

rubine

EXAMPLE 194

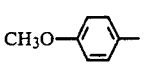

rubine

EXAMPLE 195

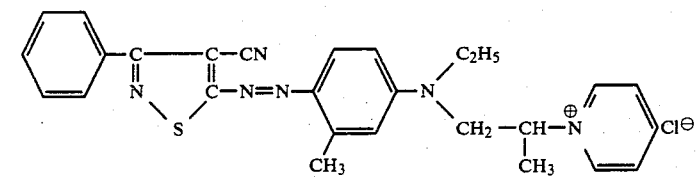

rubine

In Table IV below gives the structural composition of further compounds which can be produced in accordance with the procedure of Example 1 or 2. They are of the formula

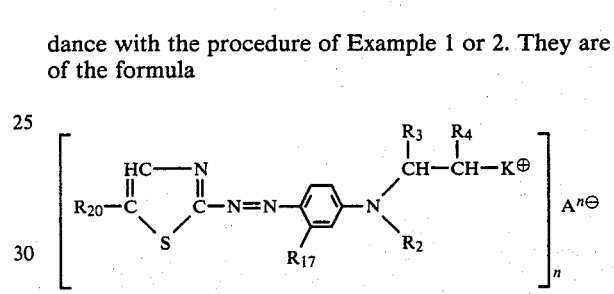

where $R_2$ to $R_4$, $R_{17}$, $R_{20}$ and $K^⊕$ have the meanings given in the table. The anion $A^⊖$ may be any one of those named in the foregoing.

Table IV

| No. | $R_{20}$ | $R_2$ | $R_3$ | $R_4$ | $R_{17}$ | $K^⊕$ | Shade of dyeing polyacrylo-nitrile fibre |
|---|---|---|---|---|---|---|---|
| 196 | $O_2N$— | —$CH_3$ | H | —$CH_3$ | H | $K_1$ | violet |
| 197 | " | " | H | " | H | $K_{10}$ | violet |
| 198 | " | " | H | " | H | $K_{19}$ | violet |
| 199 | " | —$C_2H_5$ | H | " | —$CH_3$ | $K_1$ | reddish blue |
| 200 | " | " | H | " | " | $K_{10}$ | reddish blue |
| 201 | " | " | H | " | " | $K_{19}$ | reddish blue |
| 202 | —CN | —$CH_3$ | H | " | H | $K_1$ | rubine |
| 203 | " | " | H | " | H | $K_{10}$ | rubine |
| 204 | " | " | H | " | H | $K_{19}$ | rubine |
| 205 | " | —$C_2H_5$ | H | " | —$CH_3$ | $K_1$ | violet |
| 206 | " | " | H | " | " | $K_{10}$ | violet |
| 207 | " | " | H | " | " | $K_{19}$ | violet |

EXAMPLE 208

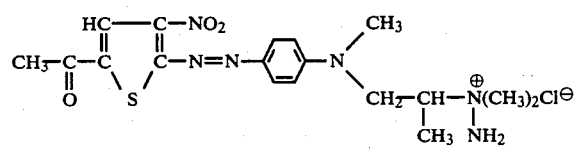

Shade of dyeing on polyacrylonitrile: violet

EXAMPLE 209

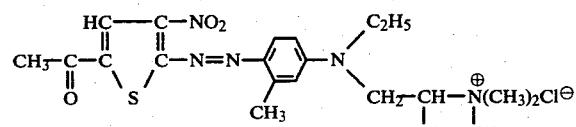

reddish blue

EXAMPLE 210

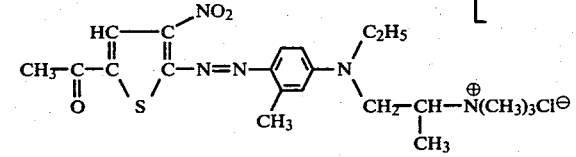

reddish blue

EXAMPLE 211

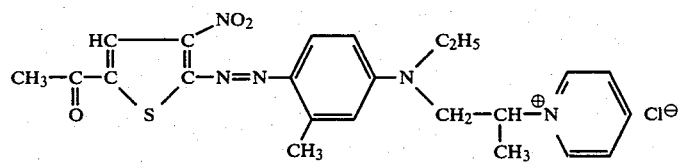

reddish blue

What is claimed is:
1. A compound of the formula

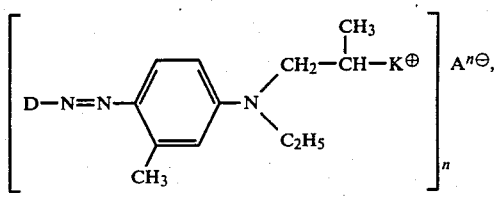

wherein D is

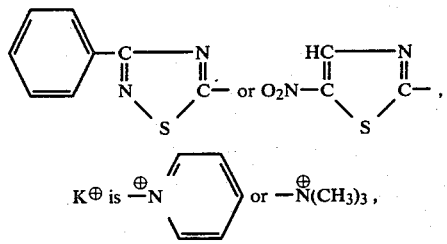

n is 1, 2 or 3, and $A^{n\ominus}$ is a non-chromophoric anion.

2. A compound according to claim 1 having the formula

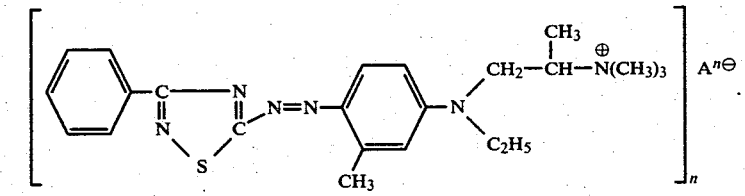

3. A compound according to claim 1 having the formula

[structure] $A^{n\ominus}$

4. A compound according to claim 1 having the formula

5. A compound according to claim 1 having the formula
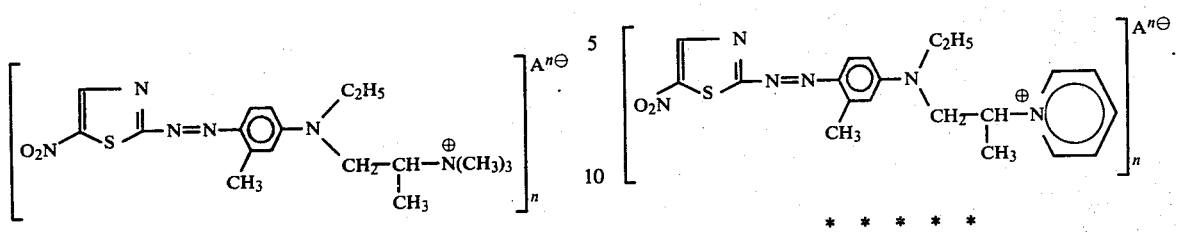
* * * * *